(12) United States Patent
Yajima et al.

(10) Patent No.: US 9,285,735 B2
(45) Date of Patent: Mar. 15, 2016

(54) FOAMED BODY MOLDING SYSTEM, ROLLER PRODUCED BY FOAMED BODY MOLDING SYSTEM, AND IMAGE FORMING APPARATUS WITH ROLLER PRODUCED BY FOAMED BODY MOLDING SYSTEM

(71) Applicants: Kentaroh Yajima, Kanagawa (JP); Daisuke Tanaka, Kanagawa (JP)

(72) Inventors: Kentaroh Yajima, Kanagawa (JP); Daisuke Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/541,210

(22) Filed: Nov. 14, 2014

(65) Prior Publication Data
US 2015/0153688 A1  Jun. 4, 2015

(30) Foreign Application Priority Data

Nov. 29, 2013 (JP) ................................. 2013-248464
Dec. 26, 2013 (JP) ................................. 2013-269466

(51) Int. Cl.
*G03G 15/20* (2006.01)
*B29C 44/58* (2006.01)
*B29K 105/04* (2006.01)
*B29K 105/24* (2006.01)
*B29L 31/00* (2006.01)

(52) U.S. Cl.
CPC ............ *G03G 15/206* (2013.01); *B29C 44/583* (2013.01); *B29K 2105/04* (2013.01); *B29K 2105/24* (2013.01); *B29K 2905/12* (2013.01); *B29K 2995/0008* (2013.01); *B29L 2031/767* (2013.01)

(58) Field of Classification Search
CPC ..... G03G 15/206; B29C 45/261; B29C 45/34; B29C 45/36; B29L 2031/767
See application file for complete search history.

(56) References Cited

U.S. PATENT DOCUMENTS

| | | | | |
|---|---|---|---|---|
| 5,820,803 | A * | 10/1998 | Hashimoto | .................. 264/154 |
| 2005/0111892 | A1 * | 5/2005 | Mitsuoka et al. | ............. 399/328 |
| 2011/0206428 | A1 * | 8/2011 | Fujihara | ....................... 399/333 |
| 2013/0209148 | A1 | 8/2013 | Suto et al. | |

FOREIGN PATENT DOCUMENTS

| | | |
|---|---|---|
| JP | 2006-095823 | 4/2006 |
| JP | 2006-308857 | 11/2006 |
| JP | 2007-015116 | 1/2007 |
| JP | 2013-164458 | 8/2013 |

* cited by examiner

*Primary Examiner* — Sandra Brase
(74) *Attorney, Agent, or Firm* — Harness, Dickey & Pierce, P.L.C.

(57) ABSTRACT

A foamed body molding system includes a side mold to constitute a side surface of a cylindrical cavity, a flange unit including an upper connection member to constitute an upper surface of the cylindrical cavity, a first vent hole to connect the cylindrical cavity with an upper space thereof, and a metal shaft having a diameter smaller than an inner diameter of the cylindrical cavity disposed with its lower end entering the cylindrical cavity and its upper end coaxially held with the cylindrical cavity, an upper cap unit to hold the flange unit including a second vent hole to vent air ejected from the first vent hole, and a lower cap unit including a lower connection member to constitute a lower surface of the cylindrical cavity and a raw molding material introduction cylindrical hole formed at a coaxial position with the cylindrical cavity to introduce raw molding material.

20 Claims, 11 Drawing Sheets

FIG. 4
FIG. 5
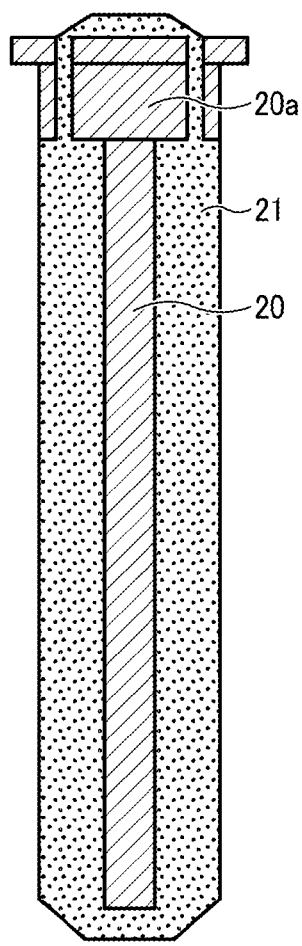
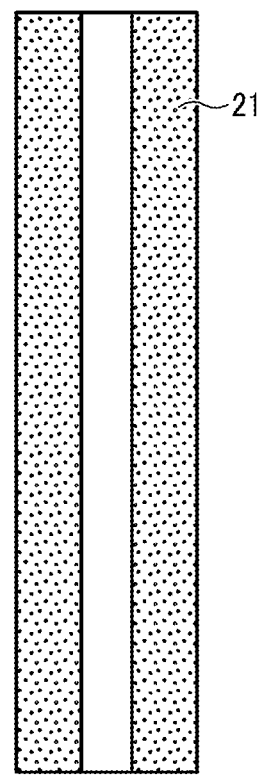

FIG. 9
FIG. 10
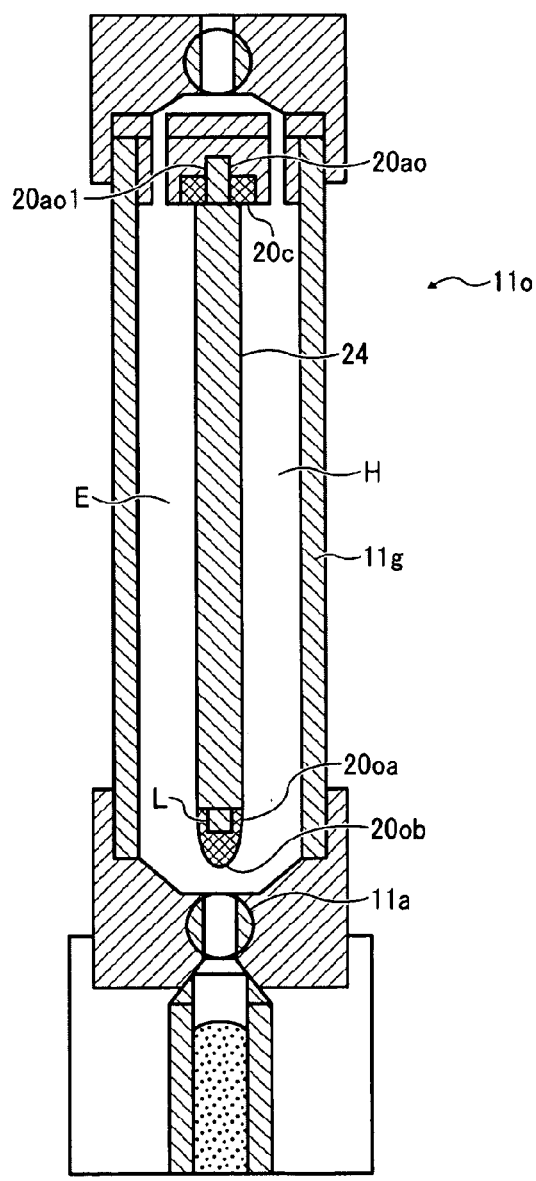
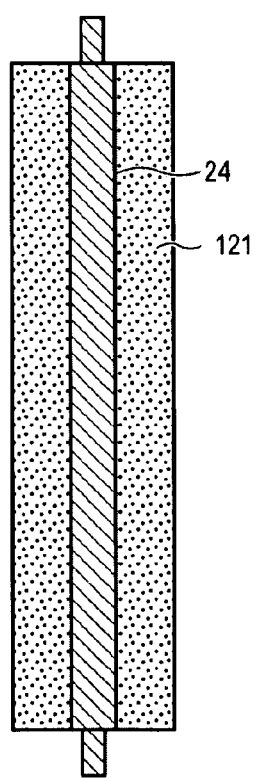

FOAMED BODY MOLDING SYSTEM, ROLLER PRODUCED BY FOAMED BODY MOLDING SYSTEM, AND IMAGE FORMING APPARATUS WITH ROLLER PRODUCED BY FOAMED BODY MOLDING SYSTEM

CROSS-REFERENCE TO RELATED APPLICATION

This patent application is based on and claims priority pursuant to 35 U.S.C. §119(a) to Japanese Patent Application Nos. 2013-248464, filed on Nov. 29, 2013, and 2013-269466, filed on Dec. 26, 2013, respectively, in the Japan Patent Office, the entire disclosures of which are hereby incorporated by reference herein.

BACKGROUND

1. Technical Field

The present invention relates to a foamed body molding system that molds a foamed tube used as an elastic roller of a fixing device provided in an electro-photographic image forming apparatus such as a copier, a printer, a facsimile machine, a multi-functional machine including multiple functions of these devices, etc.

2. Related Art

A known fixing device used in an image forming apparatus sometimes employs a thin fixing belt typically constructed of a metallic substrate and an elastic rubber layer overlying the metallic substrate.

Since it has a low heat capacity, the energy needed to heat the thin fixing belt to a prescribed temperature can be significantly reduced. As an example, a warm-up time (i.e., the time period needed to raise temperature from a room temperature the thin fixing belt to a prescribed printing temperature) can be shortened. As another example, a first printing time (i.e., the time from when a printing request is received to when a printed sheet is generated in a printing process) can be reduced as well.

In a fixing device employing the above-described fixing belt, a pressing roller is opposed to and contacted against the fixing belt to form a nip between the pressing roller and the fixing belt and transmit rotating power to the fixing belt at the same time. Conventionally, the pressing roller of the fixing device has an elastic layer composed of soft sponge made of foamed silicone rubber overlying a rotational shaft thereof. With the soft sponge of the foamed silicone rubber, since the warm-up time can be shortened while obtaining sufficient contact (i.e., a nip width) in the fixing device as well, a toner image can be appropriately fixed on the recording medium by the fixing device.

However, although the warm-up time can be shortened, the soft sponge of the foamed silicone rubber is quickly destroyed by external forces applied to the soft sponge elastic layer.

To solve this problem, a roller having a foamed body elastic insulating layer made of water-blown foamed silicone rubber having continuous air bubbles has been proposed. The foamed body elastic insulating layer is prepared by using a composition of emulsified silicone rubber using water regarded as a dispersant (hereinafter sometimes referred to as emulsion).

With the water-blown foamed silicone rubber, since air bubbles become finer and continuous, and accordingly the diameter of the roller does not thermally increase and the air bubbles are not broken, the roller can maintain a prescribed diameter and hardness thereof at the same time as well (even when it is heated during the molding process). As a result, the roller can obtain a prescribed degree of high durability.

However, even such a roller is not sufficiently durable and is to be further improved when actually employed in a fixing device of an image forming apparatus.

SUMMARY

Accordingly, one aspect of the present invention provides a novel foamed body molding system for molding a foamed tube using a cylindrical cavity. The novel foamed body molding system includes: a side mold that defines a vertically columnar inner space while constituting a side surface of the cylindrical cavity; a flange unit that includes an upper connection member connected to an upper end of the side mold to constitute an upper surface of the cylindrical cavity, a first vent hole to connect the cylindrical cavity with an upper space thereof (through the upper connection member to vent air therein), and a metal shaft having a diameter smaller than an inner diameter of the cylindrical cavity, supported within and coaxially with the cylindrical cavity by the upper connection member; an upper cap unit that holds the flange unit from above and connects the side mold with the flange unit while having a second vent hole to vent air ejected from the first vent hole outside the foamed body molding system; and a lower cap unit that includes a lower connection member to connect to the side mold from below the side mold while constituting a lower surface of the cylindrical cavity and a raw molding material introduction cylindrical hole coaxially formed with the columnar inner space to introduce a composition consisting essentially of molding-purpose foam resin from below the cylindrical cavity.

Another aspect of the present invention provides a novel roller employed in an electro-photographic fixing device. The roller includes an elastic layer constituted by a foamed body produced by the above-described foamed body molding system.

Yet another aspect of the present invention provides a novel image forming apparatus that includes a housing and a roller having an elastic layer constituted by a foamed body produced by the above-described foamed body molding system.

BRIEF DESCRIPTION OF THE DRAWINGS

A more complete appreciation of the present invention and many of the attendant advantages thereof will be more readily obtained as substantially the same becomes better understood by reference to the following detailed description when considered in connection with the accompanying drawings, wherein:

FIG. 4 is a cross-sectional view schematically illustrating an exemplary state of a molded article after vulcanizing and releasing the molded article from the molding mold according to one embodiment of the present invention;

FIG. 5 is a cross-sectional view schematically illustrating an exemplary state of the foamed tube after releasing and trimming the molded article according to one embodiment of the present invention;

FIG. 9 is a cross-sectional view illustrating an exemplary mold including a metal shaft of a roller as a metal shaft of its own to integrally mold the roller with the metal shaft of the roller according to one embodiment of the present invention;

FIG. 10 is a cross-sectional view illustrating an exemplary roller produced by using the mold of FIG. 9 in which an elastic layer and the metal shaft are integrally molded according to one embodiment of the present invention;

DETAILED DESCRIPTION

The inventors have found that a conventional elastic foamed body heat-insulating layer can rarely obtain sufficient durability due to the following reasons. That is, a dispersion state of water particles in emulsion serving as raw molding material before cross-linking is maintained by additives such as surfactants, etc. However, in the emulsion, multiple cells aggregate after the water distribution as time elapses. A shear stress is also applied to the raw molding material in a liquid feeding path during a (molding) process resulting in promoting aggregation of the water particles. Consequently, the particles aggregated water causes a weld line on a parting line and/or various problems on a surface of a molded article. That is, in an extrusion molding system for molding a tube, due to a structure of a die or the like employed therein, the parting line is inevitably generated on a surface of a molded article, and no countermeasure can be taken other than usage of a spiral die simply to reduce occurrence thereof. These problems significantly degrade partial strength of an elastic foamed body heat-insulating layer. Further, in both injection molding and casting systems, the parting line is inevitably generated again at a junction interface, at which material merge together, when emulsion as raw molding material is filled via more than one gate. Even when such casting systems employ a single gate structure, either an air gathering spot is generated resulting in production of a defective molded article or water particles aggregate due to a shear stress applied (to the raw molding material) in a liquid feeding and filling path resulting in occurrence of fine defect in the molded article. In addition, both ends of a metal shaft placed at a center of a cavity of a mold to mold a tube must be fixed, a parting line is drawn (on a surface of a molded article) again because the raw molding material goes around the metal shaft. As a result of investigation of these causes of degradation of durability, the inventors of the present invention have made various embodiments thereof related to a foamed body molding system capable of molding a foamed tube while reducing prescribed problems and weld lines thereon.

Hence, it is to be noted one embodiment of the present invention provides a foamed body molding system capable of providing a foamed tube capable of providing sufficient durability to a pressing roller included in an image forming apparatus when it is used as an elastic layer of the pressing roller. Another embodiment of the present invention provides a roller with such an elastic layer and an image forming apparatus with such a roller as well.

Figure 1:
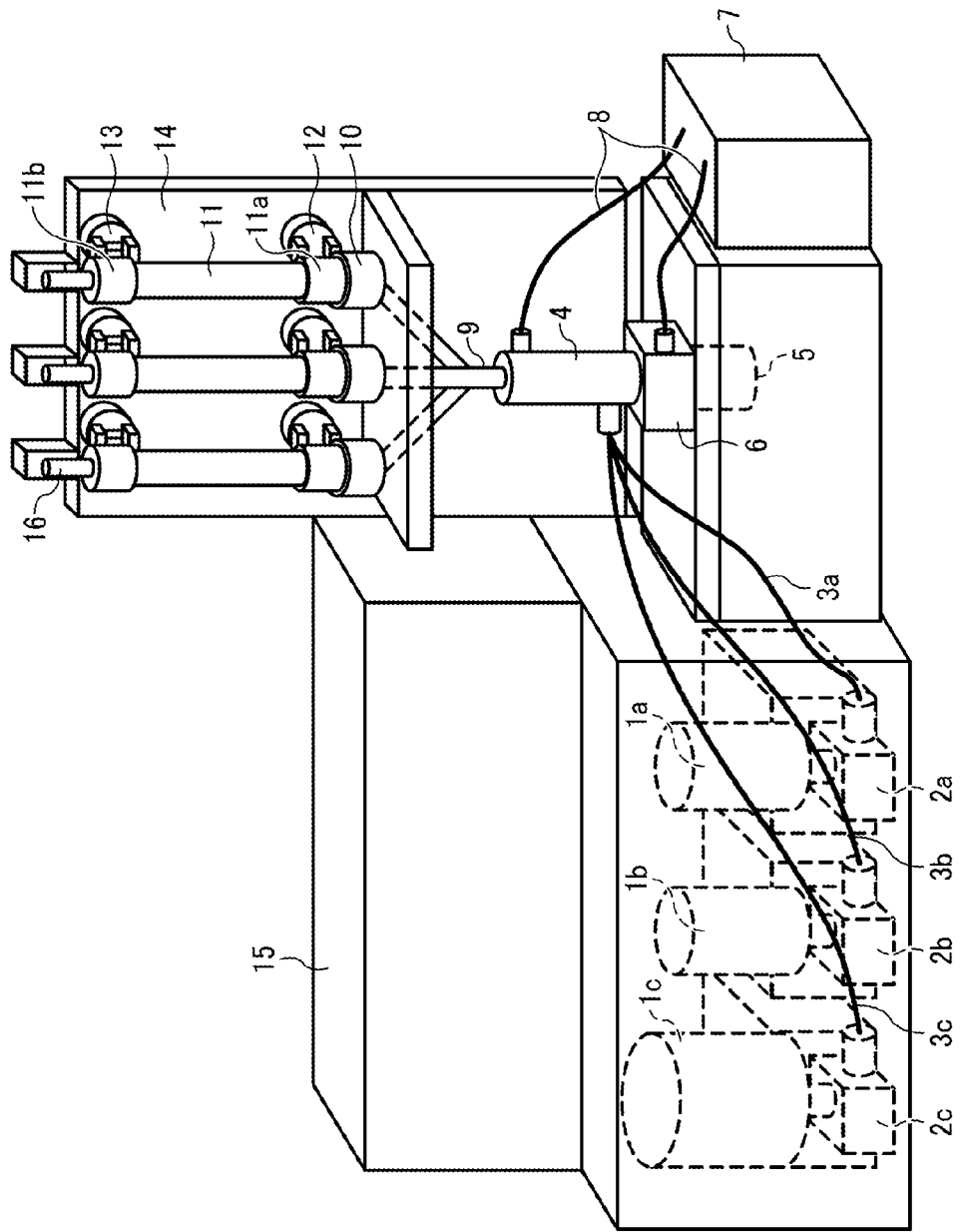
FIG. 1 is a diagram schematically illustrating an exemplary foamed body molding system according to one embodiment of the present invention.

Referring now to the drawings, wherein like reference numerals designate identical or corresponding parts throughout the several views thereof and in particular to FIG. 1, an exemplary foamed body molding system according to one embodiment of the present invention is described.

As illustrated, multiple material tanks 1a, 1b, and 1c respectively store a first liquid silicone agent, a second liquid silicone agent, and water, respectively. That is, since two-component heat curing type liquid silicone is often used in terms of convenience of handling in general, this system has three storage tanks including two tanks storing the two-component heat curing type liquid silicone and a single tank storing water.

The raw material is sent to a mixer 4 by multiple liquid feeding pumps 2a, 2b and 2c through multiple liquid feeding pipes 3a, 3b and 3c, respectively. At this time, two kinds of a mixture ratio between the liquid silicone and the water can be continuously (i.e., linearly) determined by controlling these liquid feeding pumps can 2a, 2b and 2c. In this example, each of these pumps selectively employs a precision type to match with viscosity of the material and performance of additives as well. Material of a wetted part is desirably stainless steel. As the precision type pump, a gear pump or a mohno-pump are desirably used, for example. A sliding section and a seal are desirably made of fluorine resin or fluorine rubber. As illustrated, the liquid feeding pumps 2a, 2b, and 2c are disposed near the lowest position of the apparatus, specifically, at a section lower than the raw material storage tanks and the mixer 4 as well. These liquid feeding pipes 3a, 3b and 3c connecting these liquid feeding pumps with the mixer 4 are connected to the mixer 4 each not to accumulate air (i.e., air bubbles) in the middle thereof. Specifically, a descending section in which raw liquid material falls down is omitted, and raw material of liquid simply rises during liquid feeding. With a configuration like this, a molded article can prevent from spoiling uniformity thereof due to the air.

In this example, a dynamic mixer having an inner rotating blade is used as the mixer 4. The mixer 4 is driven by a motor 5 provided at a lower site of the apparatus at a revolution speed of from about 1000 rpm (i.e., revolutions per minute) to about 3000 rpm to apply a shearing force and evenly disperse the raw material.

Here, since a rotating sliding section of the mixer 4 generates heat due to friction, and accordingly material near the wetted part in the mixer 4 solidifies and is mixed into a molded article as foreign material, thereby possibly spoiling uniformity of the molded article. To prevent such an event, a cooling jacket 6 and a chiller 7 collectively circulate cooling water in the mixer 4 through multiple cooling water pipes 8. The cooling water desirably has an ability to sufficiently cool the water stored in the mixer 4 down to from about 0 degree Celsius to about 10 degree Celsius without freezing the water. Since heat is generated by friction between an internal vane and emulsion at each of mixing sections in the mixer 4, the cooling jacket 6 is desirably configured to entirely cover a surface of the mixer 4. Here, the mixer 4 is disposed with its entrance located at a bottom and its exit located at the top thereof, so that raw material can be introduced from the bottom and is subsequently fed upward therefrom after it is mixed up and rendered as raw molding material E (i.e., emulsion) therein. Since the material flows upward like this, air rarely enters thereinto even when the material is filled into the mixer 4 for the first time.

The exit of the mixer 4 is connected to multiple injection nozzles 10 provided in multiple molding molds 11, respectively, via multiple branch pipes 9.

These molding molds 11 are set just above the injection nozzles 10, respectively. The number of molding molds 11 to be set is determined in accordance with the capacity of the cavity of the mold, the type of material, and the emulsion generation speed of the mixer. However, preferably two or more molds are employed and set by taking productivity into account. A pair of ball valves 11a and 11b as described later in detail is provided at the top and bottom of the molding mold 11, respectively, to keep inner pressure of the mold constant during vulcanization. A pair of rotary actuators 12 and 13 is also installed to open and close these valves respectively, in a structure 14 of the apparatus. Each of the molding molds 11 is held by a chuck 16 with an axis of a cylindrical cavity inside thereof being vertical.

As illustrated in FIG. 1, by vertically disposing the molding mold 11 longitudinally in parallel with the axis of the cylindrical cavity (not illustrated) inside thereof, invasion of the air can be likely prevented when the material is filled into the mold. In addition, by centering the center of gravity of the molding mold 11, a thickness of a tubular molded article can be accurately maintained easily.

The motor 5, the pair of rotary actuators 12 and 13, and the pair of ball valves 11a and 11b disposed in the liquid feeding path or the like are automatically controlled by a control console 15 appropriately.

When a molded article molded by the foamed body molding system is used as a fixing member, heat resistance capable of resisting more than 100 degree Celsius is needed to fix toner. When an elastic layer of a pressing roller included in the fixing device is produced, liquid silicone is employed as raw material therefor. At the same time, since torque resistance is additionally required in such a situation, and accordingly strength of the elastic layer needs to be enhanced, silica particles or glass fibers and the like are added to the raw material of the liquid silicone. When water-blown foamed silicone is employed, two-part liquid silicone is chosen in view of manufacturing convenience, and a catalyst is combined therewith to control a starting point of cross linking to be about 50 degree Celsius thereby suppressing curing thereof at room temperature. In addition, a surfactant is added to the water-blown foamed silicone to stabilize dispersion performance (of the water) after dispersion thereof. To improve mixing performance in the mixer 4 illustrated in FIG. 1, density of the liquid silicone is preferably the same or close to that of the water. Further, a thickener agent is favorably added to the water (used together) to enhance the mixing performance as well.

From the heat resistance and strength required by the pressing roller, a weight ratio between silicone and water each supplied to the mixer 4 preferably ranges from about 1:1 to about 1.5:1. That is, when a combined amount of the water is below (i.e., outside) these ranges, sufficient heat resistance performance cannot be obtained. By contrast, when the combined amount of the water exceeds (i.e., outside) these ranges, the strength of a molded article can be insufficient sometimes.

To maintain durability of the molded article, the raw molding material E (i.e., emulsion) supplied to the molding mold 11 desirably has a cell diameter of about 10 μm at a center of number distribution thereof. A mixing condition in the mixer 4 and an amount of surfactants to be added are then adjusted to be able to obtain a molded article having a cell structure with continuous foams.

Figure 2:
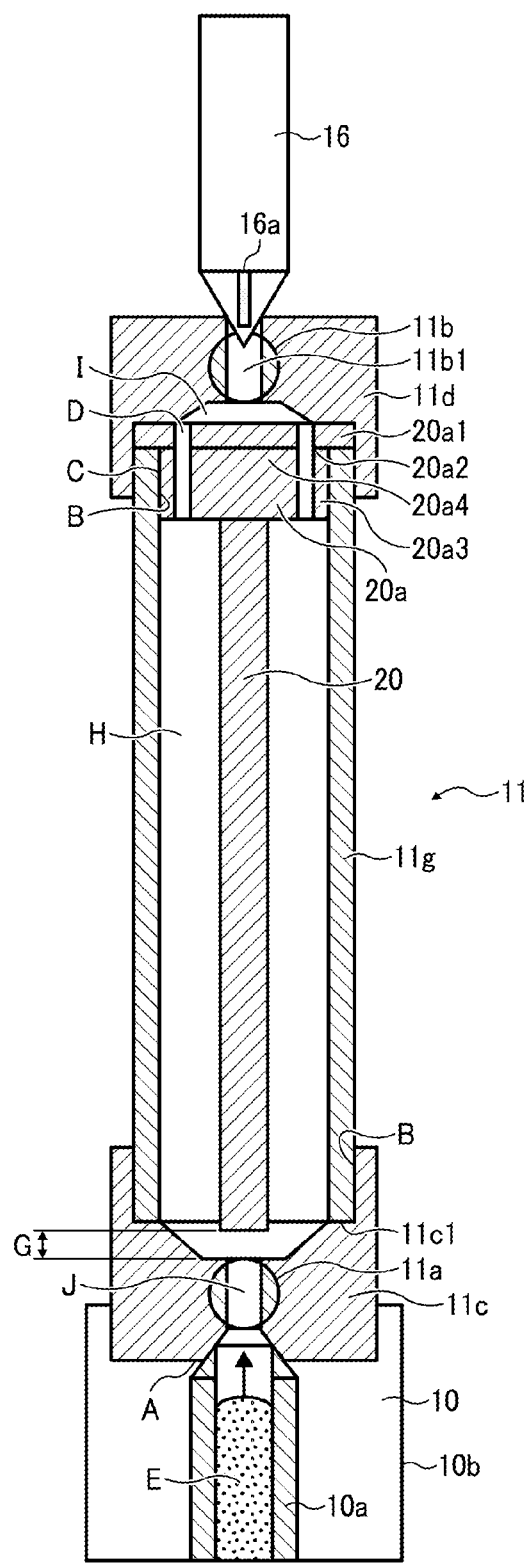
FIG. 2 is a cross-sectional view schematically illustrating a molding mold of the foamed body molding system of FIG. 1 according to one embodiment of the present invention.

FIG. 2 is a cross-sectional view illustrating an aspect of the typical molding mold 11 and the typical injection nozzle 10 just before raw molding material E is introduced into the molding mold 11 in a raw material introduction process.

As illustrated there, the molding mold 11 is configured mainly by four units in this example as described below in detail.

A first one of the four units is a side molding mold 11g defining an inner space therein with its axis vertically kept when raw molding material E is filled thereby molding a mold therein. Thus, the side molding mold 11g constitutes a side surface of a cylindrical cavity H.

A second one of the four units is a flange unit 20a configured by an upper connection section 20a4 and a metal shaft 20. In the upper connection section 20a4, there is provided a first vent hole D to connect the cavity H with an upper space. The upper connection section 20a4 connects to an upper end of the side molding mold 11g thereby constituting (defining) an upper surface of the cavity H. An upper end of the metal shaft 20 is held in the cavity H coaxially with the above-described axis (of the columnar inner space of the side mold) when raw molding material E is filled thereby molding a mold therein. The metal shaft 20 has a slender columnar shape thinner than an inner diameter of the cavity H.

A third one of the four units is an upper cap 11d that holds the flange unit 20a from above and connects the flange unit 20a with the side molding mold 11g when raw molding material E is filled thereby molding a mold therein. The upper cap 11d has a second vent hole 11b1 to release air sent from the first vent hole D to an outside thereof.

A fourth one of the four units is a lower cap 11c that includes a lower connection surface 11c1 that connects to the side molding mold 11g from below to constitute a lower (bottom) surface of the cavity H when raw molding material E is filled thereby molding a mold therein, and a raw molding material E introduction hole J coaxially formed with the cavity H to introduce a composition consisting essentially of molding-purpose foam resin (i.e., raw molding material E) from below the raw molding material introduction hole J to the cavity H when molding a mold therein.

Here, as illustrated in the drawings, the raw molding material introduction hole J and the second vent hole 1b1 are provided in a pair of ball valves 11a and 11b, respectively. These ball valves 11a and 11b are controlled by the above-described control console 15 to be able to rotate by the angle of about 90 degrees to be open and closed. Among them, the ball valve 11a is provided with a small gap to allow a small amount of air to pass therethrough while prohibiting the raw molding material E to do pass it through even it is closed.

The typical injection nozzle 10 includes a tubular connection inlet 10a at around its center and a housing 10b as well. A portion near the bottom of the molding mold 11 fits into a recess formed at a top of the housing 10b. Hence, under a weight of the molding mold 11 and pressure of the chuck 16 disposed above the molding mold 11 as well, the raw molding material introduction hole J provided in the lower cap 11c watertightly connects to the connection hole 10a of the injection nozzle 10 at a boundary surface A.

The boundary surface A is preferably tapered to effectively seal the raw molding material E. Here, the chuck 16 reciprocates vertically, and holds the molding mold 11 when it goes downward. On a cone-shaped side surface of the chuck 16, an air-venting groove 16a is formed to vent to air of the cavity H when the raw material is filled thereinto. For this reason, even when a tip of the chuck 16 mates with the second vent hole 11b1 and subsequently depresses the molding mold downward, the air in the cavity H can be vented when the raw material is introduced thereinto.

Near the upper and lower ends of an outer surface (wall) of the side molding mold 11g, a pair of screw parts B is provided, respectively, and is screwed into a pair of corresponding screws provided in the upper and lower caps 11d and 11c, respectively. In this way, the upper cap 11d, the flange unit 20a, the side molding mold 11g, and the lower cap 11c are connected to each other.

Here, the upper connection section 20a4 of the flange unit 20a has a flange portion 20a1 having a large diameter than the inner diameter of the cavity H and a columnar section 20a3 that fits into the side molding mold 11g. The flange portion 20a1 and the columnar section 20a3 are joined together to collectively form a stepping section 20a2. On a lower surface of the columnar section 20a3 constituting an upper surface (wall) of the cavity H, the cylindrical metal shaft 20 thinner than the inner diameter of the cavity H is provided with its upper end coaxially held with the above-described cavity H. Multiple first vent holes D penetrating through the flange portion 20a1 and the columnar section 20a3 are also provided to connect an upper space I formed in the upper cap 11d with the lower cavity H.

As described heretofore, by fitting the inner side surface of the side molding mold 11g to an outer surface of the columnar section 20a3, the metal shaft 20 can be positioned coaxially with the columnar inner space of the side mold.

The lower surface of the flange portion 20a1 of the upper connection section 20a4 of the flange unit 20a is water-tightly connected to the upper end of the side molding mold 11g as the upper cap 11d is screwed into the side molding mold 11g.

The lower cap 11c similarly includes a lower connection surface 11c1 that watertightly connects to a lower end surface of the side molding mold 11g when it is screwed into the side molding mold 11g as well.

An opening provided in the raw molding material introduction hole J opened to the cavity H is positioned below the bottom of the metal shaft 20.

As a material used for molding the molding mold 11, stainless material, SUS303, and SUS304 are preferably used in consideration of an internal stress of several dozens of Mega Pascal arising at a time of vulcanization of raw molding material E and abrasion caused by silica contained in the raw molding material E. In view of cost, when ferrous material is used, hard plating with hard chrome or the like is preferably applied to a surface of the ferrous material. In this embodiment, the SUS303 is practically used, for example.

In terms of ensuring quality emulsion, a wetted surface (of the molding mold 11 and the metal shaft 20) needs to reduce its unevenness as much as possible. However, roughness of a polished surface of the metal shaft 20 is set below about Ra 0.8 µm in this example to contribute to adhesive force when a molded article is used in a roller.

In this example, an inner diameter of the side molding mold 11g is about 35 mm, and a length thereof is about 400 mm. A clearance formed at a fitting section C, i.e., a difference between the outer diameter of the columnar section 20a3 and the inner diameter of the cavity H is preferably from about 10 µm to about 30 µm in view of easy attachment and detachment of the flange unit 20a thereto and therefrom. Accordingly, in this example, the clearance is about 20 µm and a width of the fitting section C is about 40 mm.

As illustrated in FIG. 2, the raw molding material E is filled into the cavity H from the nozzle 10. In the cavity H, a molding part near a gap G between the opening open to the cavity H and the bottom of the metal shaft 20 corresponds to an unnecessary part to be removed thereafter. Thus, in order to minimize an amount of raw molding material E filled in such a section, the gap G is preferably made as small as possible. However, a flow path for the raw molding material E to flow is narrowed in this section by contrast.

Here, since the raw molding material E is W/O (water droplets in oil) structure emulsion, a uniformly distributed state of the raw molding material E is broken by a shear stress applied when it is fed along the flow path. Consequently, the water is condensed thereby causing surface problems on (a molded article). Therefore, the gap G preferably has a prescribed size not to pose a load on the raw molding material E. That is, if the gap G is equal to or greater than a value obtained by dividing a cross-sectional area $\pi R^2$ of the raw molding material introduction hole J by the circumference $2\pi R$ of the raw molding material introduction hole J (i.e., $R^2/2R$ or more) when a diameter of the raw molding material introduction hole J is 2R, the raw molding material E can be filled into the cavity H under an extremely small load. Accordingly, in this example, the diameter of the raw molding material introduction hole J is about 10 mm. At this time, the gap G is preferably about 2.5 mm or more, and accordingly, it is practically about 3 mm in this example. Here, to avoid stress concentration in the liquid flow path, angular sections (i.e., corners) therein preferably have curved or chamfered surfaces, and are practically chamfered in this example.

According to one embodiment of the present invention, since the raw molding material introduction hole J and the metal shaft 20 are coaxially placed with each other while designing the gap G as described above, the raw molding material E can be evenly filled into the cavity H. Accordingly, a molded article can likely avoid the defective parting line or the like while reducing condensation of air bubbles therein.

Further, in this example, out of the entire upper surface of the lower cap 11c, a portion within the cavity H (i.e., a bottom thereof) is tapered like a bell by gradually enlarging a diameter thereof upwardly (thereby constituting a chamfered surface). With such a structure, since the shearing force applied from the raw molding material introduction hole J to the raw molding material E supplied to the cavity H can be relieved, a molded article with fewer problems can be obtained accordingly.

As described earlier with reference to FIG. 2, the raw molding material E is supplied from the raw molding material introduction hole J and is filled into the cavity H. At that time, the air in the cavity H is ejected outside the molding mold 11 while passing through the first and second vent holes D and 11b1. When a given amount of raw molding material E is filled, the raw molding material E is stopped supplying and thereby terming a process of supplying the raw molding material E thereto. Subsequently, the process goes to a cross-linking stage as illustrated in FIG. 3.

Figure 3:
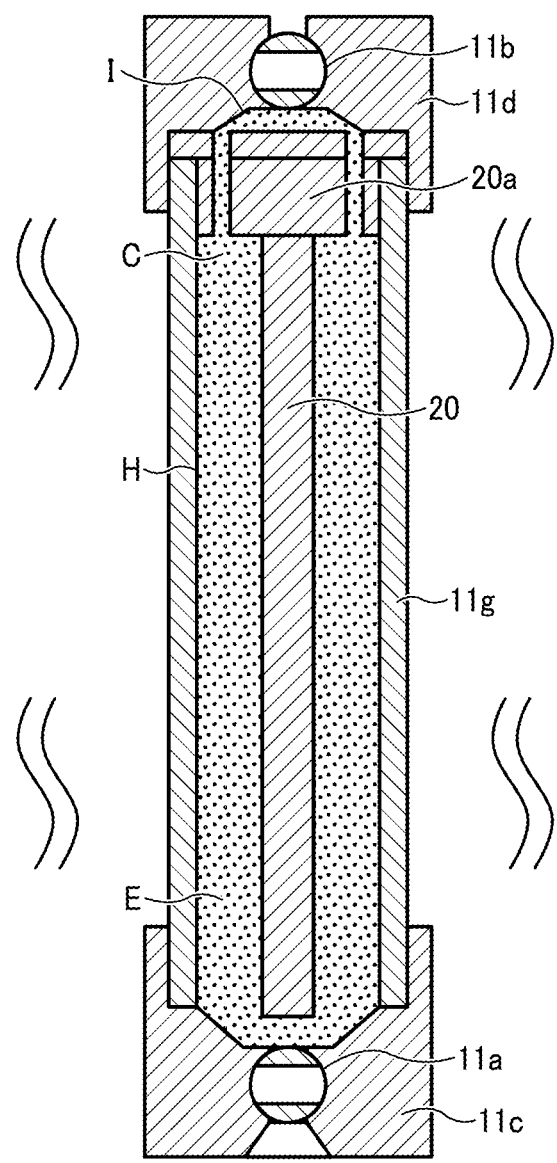
FIG. 3 is a cross-sectional view schematically illustrating an exemplary vulcanizing state of the molding mold of FIG. 2 according to one embodiment of the present invention.

FIG. 3 illustrates a molding state (i. e., a vulcanization step) of a molding mold 11. As illustrated, the pair of ball valves 11a and 11b is each rotated by the angle of 90 degrees to change their direction, thereby sealing the raw molding material E in the molding mold 11. At that time, since coaxial relation between the side molding mold 11g and the metal shaft 20 is maintained by the fitting section C acting as the contact surface between the flange unit 20a and the side molding mold 11g, a tube of the water-blown foamed silicone rubber can be formed with a constant (uniform or same) thickness.

After filling the raw molding material E, the vulcanizing step is executed by heating the molding mold 11 (as a heating step). At that time, however, to continuously maintain a posture of the metal shaft 20, the axis of the cavity H is preferably kept vertically. To vulcanize, a uniformly heating system is preferably employed, and accordingly, a continuous furnace may be used in view of productivity thereof, for example. To let gas generated as cross-linking reaction of the emulsion E in the molding mold 11 to go off, respective clearances formed between the valves 11a and 11b and the upper and lower caps 11c and 11d preferably range from about 10 μm to about 30 μm to maintain sliding performance of those. Accordingly, about 20 μm is practically employed in this example. These clearances allow compatibility between keeping a shape of the raw molding material E in the mold until vulcanization starts and degassing after start of vulcanization. Hence, due to the above-described small gap disposed in the ball valve 11a of this example, since the gas generated during the molding process can evacuate from the molding mold 11 to an outside, production of a defective molded article can be likely avoided.

A sufficient amount of heat is desirably applied to the raw molding material E to stabilize air bubbles generated therein. Hence, although it varies depending on a type of it, the raw molding material E is heated at temperature ranging from about 80 degree Celsius to about 100 degree Celsius for one hour, for example.

After the molding, the molding mold 11 is opened and a molded article is stripped off. Specifically, the upper and lower caps 11c and 11d are detached and the molded article is lifted up from therebelow to be stripped off from the molding mold 11 as illustrated in FIG. 4. That is, a stripped state of a molded article stripped off from the molding mold 11 is illustrated in FIG. 4. As there shown, the molded article is pulled out together with the flange unit including the upper connection section 20a4 and the metal shaft 20 as well.

Subsequently, multiple runners attached to both ends of the molded article are cut off, so that a water-blown foamed silicone rubber tube (hereinafter, also referred to as a foamed body tube) 21 can be obtained as a cylindrical elastic layer as schematically illustrated in FIG. 5. Then, as a secondary vulcanization process, the water-blown foamed silicone rubber tube 21 is heated at a temperature ranging from (between) about 200 degree Celsius to about 250 degree Celsius for about four hours to completely vaporize the inner water and generate cells, thereby completing a cross-linking reaction. As a result, the water-blown foamed silicone rubber tube 21 can obtain various characteristics, such as strength, hardness, etc., as required for it.

Thus, according to one embodiment of the present invention, since only an upper part of the metal shaft of the molding mold is held while keeping it coaxially with the cavity H of the side mold and the raw molding material introduction hole J as well, interfering structures can be omitted on a raw molding material injection side thereof. For this reason, occurrence of a weld line which generally degrades durability of the molded article when used in a roller can be likely avoided while maintaining high precision in shaping the molded article.

Figure 6A:
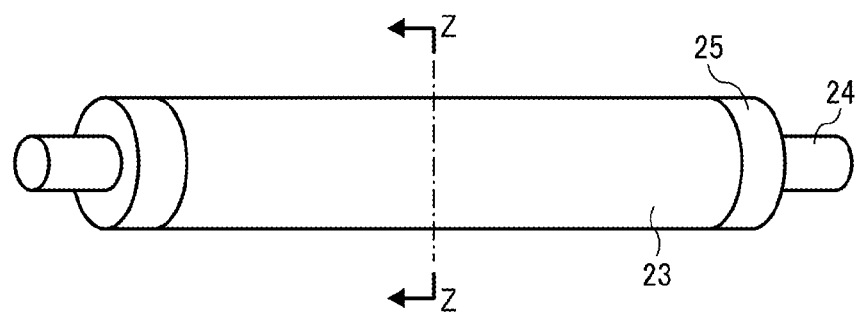
FIG. 6A is a perspective view schematically illustrating an exemplary fixing roller having the foamed tube as an elastic layer produced by the molding mold according to one embodiment of the present invention.
Figure 6B:
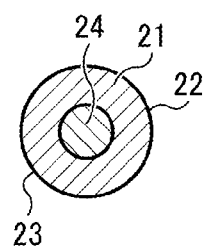
FIG. 6B is a cross-sectional view schematically illustrating the fixing roller of FIG. 6A according to one embodiment of the present invention.

FIG. 6A is a perspective view illustrating a fixing roller including an elastic layer composed of a water-blown foamed silicone rubber tube 21 produced by using the foamed body molding system according to one embodiment of the present invention. FIG. 6B is cross-sectional view also illustrating the fixing roller of FIG. 6A when taken from a Z-Z cross section in FIG. 6A. As illustrated there, the fixing roller includes the metal shaft 24 at its rotational center, an elastic layer 21 configured by the water-blown foamed silicone rubber tube 21, a one-component curable adhesive 22, a mold releasing layer 23 configured by a fluorocarbon resin tube, and a pair of gripping layers 25 provided at both ends of the fixing roller, respectively.

Herein below, an exemplary process of manufacturing a pressing roller having a water-blown foamed silicone rubber tube 21 as an elastic layer thereof is briefly described. First, as described earlier, the metal shaft 24 is inserted into the water-blown foamed silicone rubber tube 21 produced by the foamed body molding system of one embodiment of the present invention with pressure. At that time, the water-blown foamed silicone rubber tube 21 is glued with the metal shaft 24 using prescribed glue. Otherwise, a primer can be preferably used instead of the prescribed glue to enhance adhesive strength between the water-blown foamed silicone rubber tube 21 and the metal shaft 24. As the primer, a silicone-based adhesive with assistance of silane coupling agent may be used. That is, the silicone-based adhesive can provide preferable heat resistance and adhesive performance as well. Subsequently, the water-blown foamed silicone rubber tube 21 is appropriately cut off to shape it as a roller. Subsequently, the surface of the elastic layer 21 molded in this way is uniformly coated with one-component curable adhesive 22, for example, and another tube 23 made of fluorine resin is overlaid thereon and adheres thereto, the fixing roller can be obtained.

Further, because it is used as the pressing roller, in terms of torque transmission, a pair of gripping layers 25 is formed near the ends of the tube 23 as illustrated in FIG. 6. To obtain favorable stickiness and heat-resistant performances as well, the pair of gripping layers 25 is preferably made of silicone rubber. Each of the pair of gripping layers 25 preferably has a thickness of from about 10 μm to about 100 μm not to contribute to formation of a nip on the pressing roller.

Figure 7:
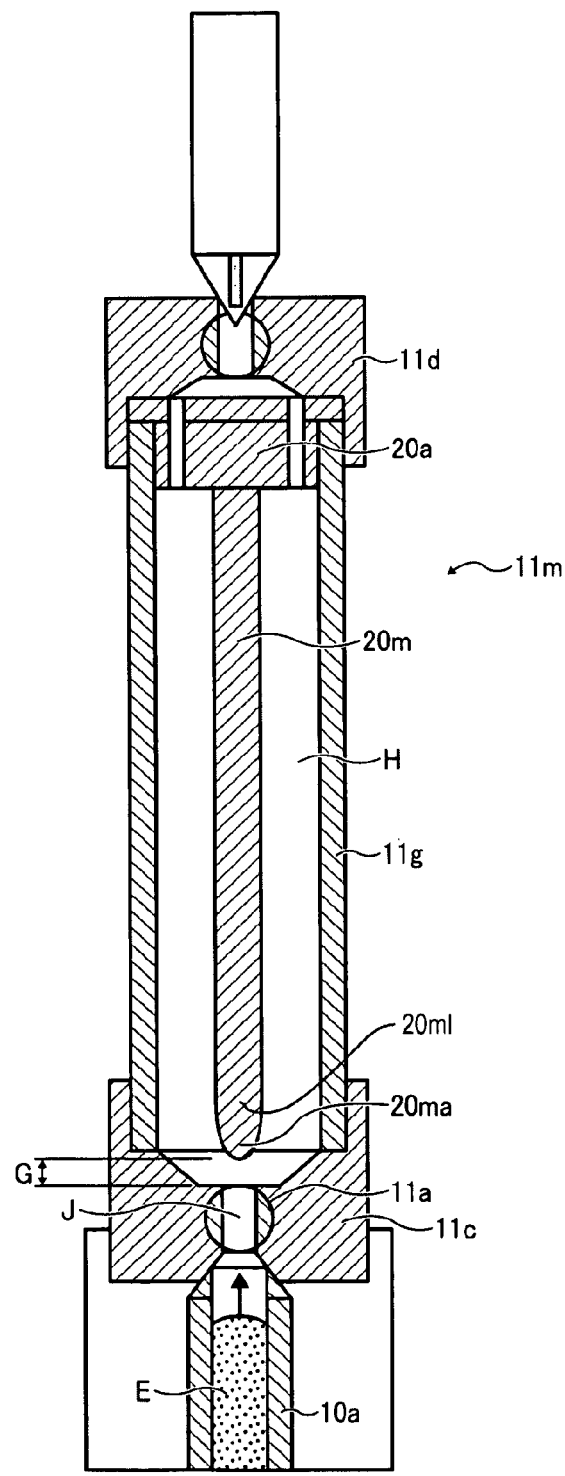
FIG. 7 is a cross-sectional view illustrating an exemplary mold with a metal shaft having a variable diameter becoming smaller toward a tip thereof according to one embodiment of the present invention.

Another exemplary molding mold 11m may be employed as illustrated in FIG. 7. As there shown, a diameter of a metal shaft 20m used in a molding process gradually decreases at the bottom 20m1 of the metal shaft 20m towards a tip 20ma thereof.

With this like configuration, pressing load (i.e., pressure) applied to the raw molding material E when it is filled into the molding mold 11m can be further reduced. In this way, since condensation of air bubbles in the raw molding material E can be minimized enough, a foamed body tube with fewer surface problems can be produced. Accordingly, when the foamed body tube is used in a roller, durability thereof can be upgraded more than before.

Figure 8:
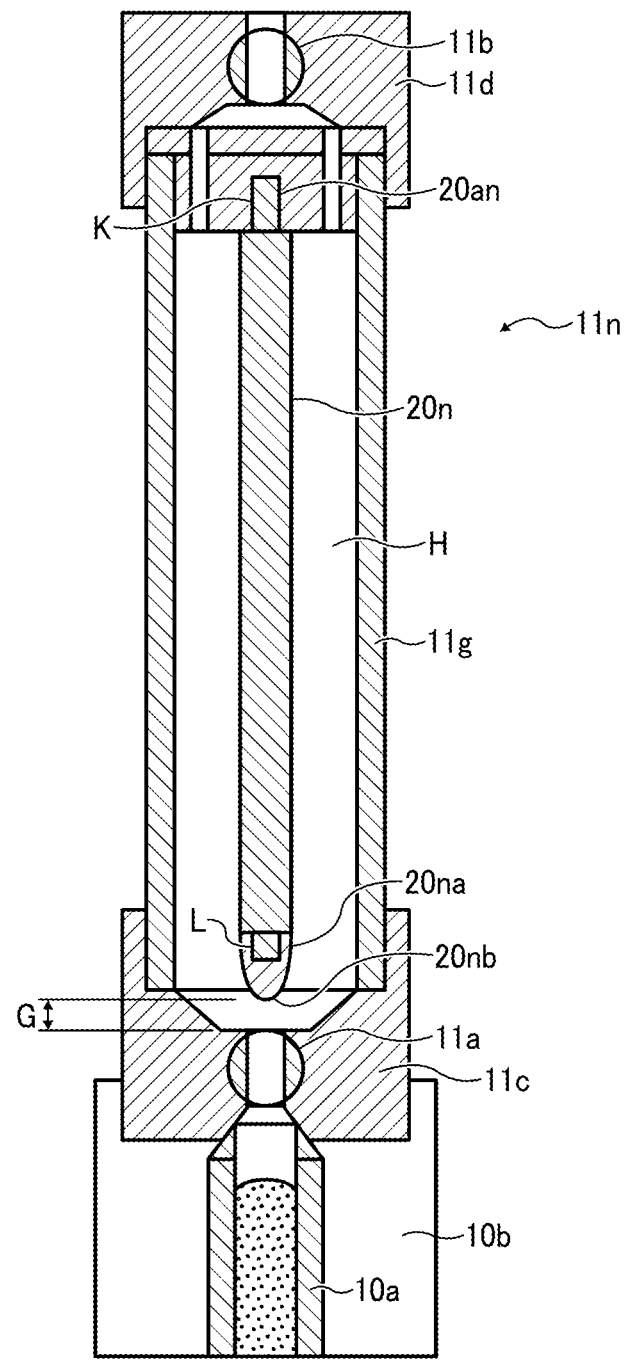
FIG. 8 is a cross-sectional view illustrating another exemplary mold with a detachable metal shaft according to one embodiment of the present invention.

Yet another exemplary molding mold 11n may be employed as illustrated in FIG. 8. As there shown, the molding mold 11n includes a flange unit having three parts of an upper connection part 20an constituting an upper connection section, a metal shaft part 20n constituting a metal shaft, and a cap 20na having a variable diameter becoming smaller toward its tip 20nb. These upper connection part 20an and metal shaft part 20n removably mate with each other at a fitting section K as illustrated. A screw part L is formed at a lower end of the above-described metal shaft part 20n, so that the cap 20na can be screwed thereto and is coaxially held with metal shaft part 20n. With these configurations, even when the metal shaft part 20n is replaced with another one of the same type, the other metal shaft part 20n can be coaxially kept with the cavity of a sleeve (i.e., the side molding mold 11g) as well. Hence, since the metal shaft part can be easily replaced while maintaining precision of a molded article, a surface of the metal shaft part can be almost always kept in the best condition. Accordingly, inner surface characteristics of the molded article can be kept as well. As a result, a foamed tube with less surface problems can be produced, and accordingly, a roller can obtain increasingly higher durability when employing the foamed tube. Since a diameter of the fitting section K is about 10 mm in this example, a clearance of the fitting section K is desirably from about 10 μm to about 20 μm to obtain positional accuracy of the metal shaft part while easing replacement thereof at the same time. In this example, the clearance of the fitting section K is about 10 μm. At this situation, a length of the fitting section K is desirably about 10 mm or more, and it is about 15 mm, in this example. To prevent the raw molding material E from entering a screwing gap between male and female screws of the respective metal shaft part 20*n* and the cap 20*na* and a fitting gap between the fitting surfaces of the metal shaft part 20*n* and the upper connection part 20*an*, portions near these gap are preferably sealed, for example, with gaskets made of fluorine or the like, respectively.

Yet another molding mold 11*o* is described with reference to FIG. 9. As shown there, the molding mold 11*o* employs a columnar part made of ferromagnetic material such as iron, etc., as the metal shaft for the molding mold 11*o* to also serve as a metal shaft 24 of a roller.

In a lower portion of the upper connections part 20*ao* constituting the upper connection section during a molding process, there is provided a fitting hole 20*ao*1 to mate with the metal shaft 24. A magnet 20*c* is placed around the fitting hole 20*ao*1 to generate a magnetic field as illustrated in the drawing. With this configuration, the metal shaft 24 is held by the upper connection part 20*ao* in the magnetic field generated by the magnet 20*c* when the metal shaft 24 is fitted to the fitting hole 20*ao*1. To a lower portion of the metal shaft 24, a magnet cap 20*oa* with a variable diameter becoming smaller towards a tip 20*ob* thereof is also fitted. With this configuration, since the elastic layer can be formed around the metal shaft 24 by none of releasing it from the molding mold 110, fitting it (to the metal shaft of roller) with pressure, and bonding it thereto while preferable maintaining the same molding performance as the side molding mold 11*g* of FIG. 8, the above-described molding mold 11*o* can avoid troublesome operations like those thereby being competitive and economy as well. Also, damage possibly caused by these operations can be likely avoided. Since a new metal shaft 24 can be used at every molding processes, characteristics of the surface of the metal shaft 24 can be kept constant thereby capable of obtaining a high adhesive strength.

FIG. 10 illustrates the roller with a cylindrical elastic layer formed by using the molding mold 11*o* of FIG. 9. That is, a cylindrical elastic layer 121 is made of water-blown foamed silicone rubber and is directly (i.e., integrally) formed around the metal shaft 24 by neither releasing the metal shaft 24 therefrom nor bonding it to the cylindrical elastic layer 121.

Also, since the metal shaft 24 and the elastic layer composed of the tube 21 made of the water-blown foamed silicone rubber are glued to each other at the same time when these are integrally molded, high adhesive strength can be obtained between the metal shaft 24 and the elastic layer. Partial damage possibly caused during installation and removal (i.e., handling) of the tube 21 made of the water-blown foamed silicone rubber executed after releasing the molded article from the molding mold can be likely prevented as well.

Although various preferred embodiments have been described heretofore, a configuration of the foamed body molding system of the present invention is not limited to those and can be appropriately altered.

That is, a person skilled in the art can appropriately modify the foamed body molding system and an image forming apparatus with a molded article molded by the foamed body molding system of the present invention based on a public knowledge. In other words, if the modification yet includes the configuration of the foamed body molding system of the present invention, it is, of course, included in the scope of the present invention. Now, various practical examples are described herein below.

In the below described various practical examples, a tube made of the water-blown foamed silicone rubber is used as an elastic layer of a pressing roller employed in a most versatile color copier that is capable of accommodating an A3 size (JIS). However, the present invention is not limited to these practical examples.

A first practical example is initially described herein below. A tube of a first practical example made of water-blown foamed silicone rubber is prepared by using the foam molding system as illustrated FIG. 1 with the molding mold 11 as illustrated in FIG. 2.

A tube of a second practical example made of water-blown foamed silicone rubber is also prepared by the same manner as the first practical example except for using the molding mold with the metal shaft having the variable diameter gradually reduced toward the lower end thereof as illustrated in FIG. 7.

A tube of a third practical example made of water-blown foamed silicone rubber is also prepared by the same manner as the first practical example except for using the replaceable metal shaft as illustrated in FIG. 8. A tube of a fourth practical example made of water-blown foamed silicone rubber is again prepared by the same manner as the first practical example except for using the mold that employs the metal shaft serving as a metal shaft of a roller as illustrated in FIG. 9.

The metal shaft 24 of the pressing roller employed in preparing the fourth practical example is a typical low cost pipe made of STKM (carbon steel tube for machine-structural purposes) having preferable processability, and is fixed within the cavity H by the magnet. To enhance adhesion between the foamed body tube and the metal shaft 24, a primer is coated onto the metal shaft 24 in advance. At that time, however, since partial strength likely decreases when anti-rust plating is applied to the metal shaft 24, an anti-rust plating layer is peeled off form it and the metal shaft 24 is dressed instead to have an optimum surface roughness.

Here, by using a conventional extrusion system, a conventional press forming system, and a conventional casting system while employing the same raw molding material E (i.e., the water-blown foamed silicone), conventional water-blown foamed silicone rubber tubes are prepared, respectively. Here in below, these water-blown foamed silicone rubber tubes are referred to as an extrusion mold article, a press-forming article, and a casting article, respectively. These tubes are examined and observed, and results of examination and observation are indicated on a table 1.

Here, evaluation of various items shown in the Table 1 is made by the below described manner.

That is, a cell size of the foamed body is checked by cutting the tube, and a number (frequency) distribution of a diameter of a cell obtained from a cross section thereof is examined. When a center of the distribution is about 10 μm or less, good evaluation of the rank A is given to the tube in such a situation. By contrast, when a center of the distribution is about 10 μm or more, bad evaluation of the rank C is given to the tube in such a situation. Whereas, when a value (i.e., a diameter of a cell) locally varies and accordingly sufficient and insufficient portions are present at the same time, the good evaluation of the rank B is yet given to the tube in such a situation as is permissible.

In the next, concentricity of a tube is checked to examine shape accuracy (of the tube). When an error value of the concentricity is about 0.1 mm or less as a permissible level, good evaluation of the rank A is given to the tube in such a situation. By contrast, when the error value of the concentricity exceeds about 0.1 mm, bad evaluation of the rank C is given to the tube in such a situation. A variation in internal diameter (of the tube) is also checked and examined as well. When a deviation value of an internal diameter from a reference value (A) is 0.1 mm or less as a permissible range, good evaluation of the rank A is given to the tube in such a situation. By contrast, when a deviation value of an internal diameter is more than 10 μm from the permissible range, bad evaluation of the rank C is given to the tube in such a situation. Whereas, when a value (i.e., an internal diameter) locally varies and accordingly sufficient and insufficient portions are present at the same time, the good evaluation of the rank B is yet given to the tube in such a situation as is permissible.

In the next, occurrence of a weld line and an inner surface problem (i.e., a size) as well in a molded article (i.e., a tube) is observed visually. That is, when the weld line is absent in a tube, good evaluation of the rank A is given to the tube in such a situation. By contrast, when the weld line is present in a tube, bad evaluation of the rank C is given to the tube in such a situation.

As to the inner surface problem, it is check and evaluated as follows. That is, when no or only few inner surface problems are present regardless of an observation place, good evaluation of the rank AA is given to the tube in such a situation. Whereas, when no or only few inner surface problems are present but a frequency thereof varies depending on an observation place, good evaluation of the rank A is yet given to the tube in such a situation as is permissible. Similarly, when several dozens of inner problems are present, good evaluation of the rank B is yet given to the tube in such a situation as is permissible again. By contrast, when many inner problems are present, bad evaluation of the rank C is given to the tube in such a situation. Finally, when sufficient and insufficient portions are present at the same time, the bad evaluation of the rank B is given to the tube as is permissible in such a situation.

TABLE 1/2

| | Target value | Extrusion molding article | Press forming article | Casting article |
|---|---|---|---|---|
| Diameter of cell of foamed body | About 10 μm or less from distribution center | C | C | B |
| Accuracy of Shape | Coaxiality: Error of about 0.1 mm or less | B | A | A |
| | Inner diameter: Deviation of about ±0.1 mm or less from A | B | A | A |
| Weld line | Absent | C | A | C |
| Serious problem of Inner surface | Absent | B | A | B |
| Minor problem of Inner surface | Absent | C | B | B |
| Adhesive strength | About 80N/10 mm or more | C | C | B |

TABLE 2/2

| | Target value | First practical example | Second practical example | Third practical example | Fourth practical example |
|---|---|---|---|---|---|
| Diameter of cell of foamed body | About 10 μm or less from distribution center | A | A | A | A |
| Accuracy of Shape | Coaxiality: Error of about 0.1 mm or less | A | A | A | A |
| | Inner diameter: Deviation of about ±0.1 mm or less from A | A | A | A | A |
| Weld line | Absent | A | A | A | A |
| Serious problem of Inner surface | Absent | A | A | A | A |
| Minor problem of Inner surface | Absent | B | A | AA | AA |
| Adhesive strength | About 80N/10 mm or more | A | A | A | A |

In the next, multiple pressing rollers of a fixing device are produced under the same condition, and adhesive force between a metal shaft thereof and an elastic layer composed of the above-described tube produced by the molding mold of each of the various embodiments of the present invention overlying thereon is check and examined.

Figure 11:
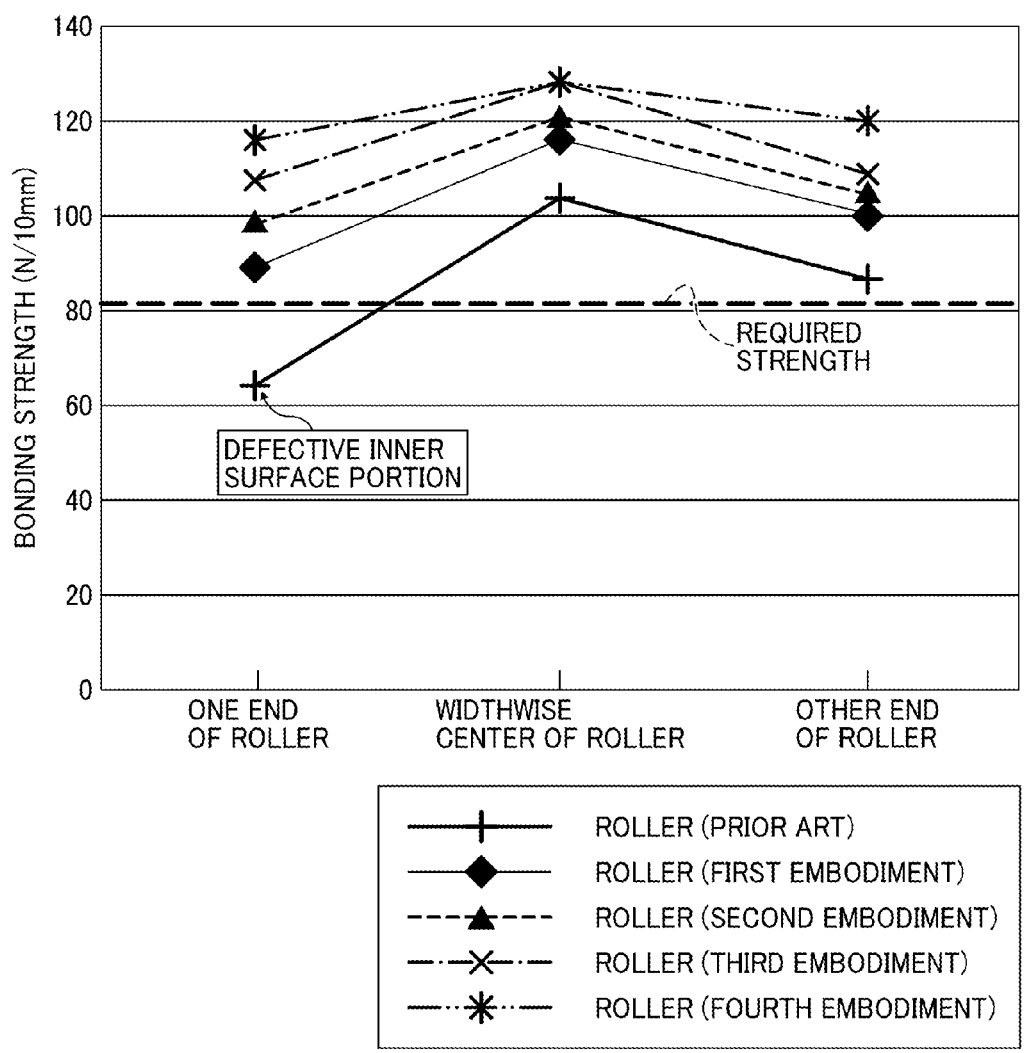
FIG. 11 is a graph illustrating exemplary adhesion strength of multiple samples prepared by a conventional casting system and various embodiments of the present invention.

Specifically, the elastic layer of the pressing roller is cut to have a cut at a prescribed place having a width (length) of about 10 mm in an axial direction thereof, and tensile strength in a tangent direction is checked and examined at the prescribed place and is obtained as illustrated FIG. 11 and the above-described table. That is, when adhesive strength is about 80 N/10 mm or more, good evaluation of the rank A is given to a pressing roller as indicated therein as is sufficient. By contrast, when adhesive strength is below about 80 N/10 mm, bad evaluation of the rank C is given to a pressing roller as indicated in the drawing as is insufficient.

Here, in FIG. 11, first and second axial ends and a center in an axial direction of a roller almost indicate both side ends and a middle of the roller in its longitudinal direction, respectively.

Hence, as understood from the table 1 and FIG. 11 as well, according to one embodiment of the present invention, the tube has a highly accurate dimension with a fine cell size in the foamed body almost due to absence of the problem and weld line therein. It is also understood from the table 1 and FIG. 11 that a preferable amount of adhesive force can be obtained between the tube and the metal shaft when these are used in a roller.

Figure 12:
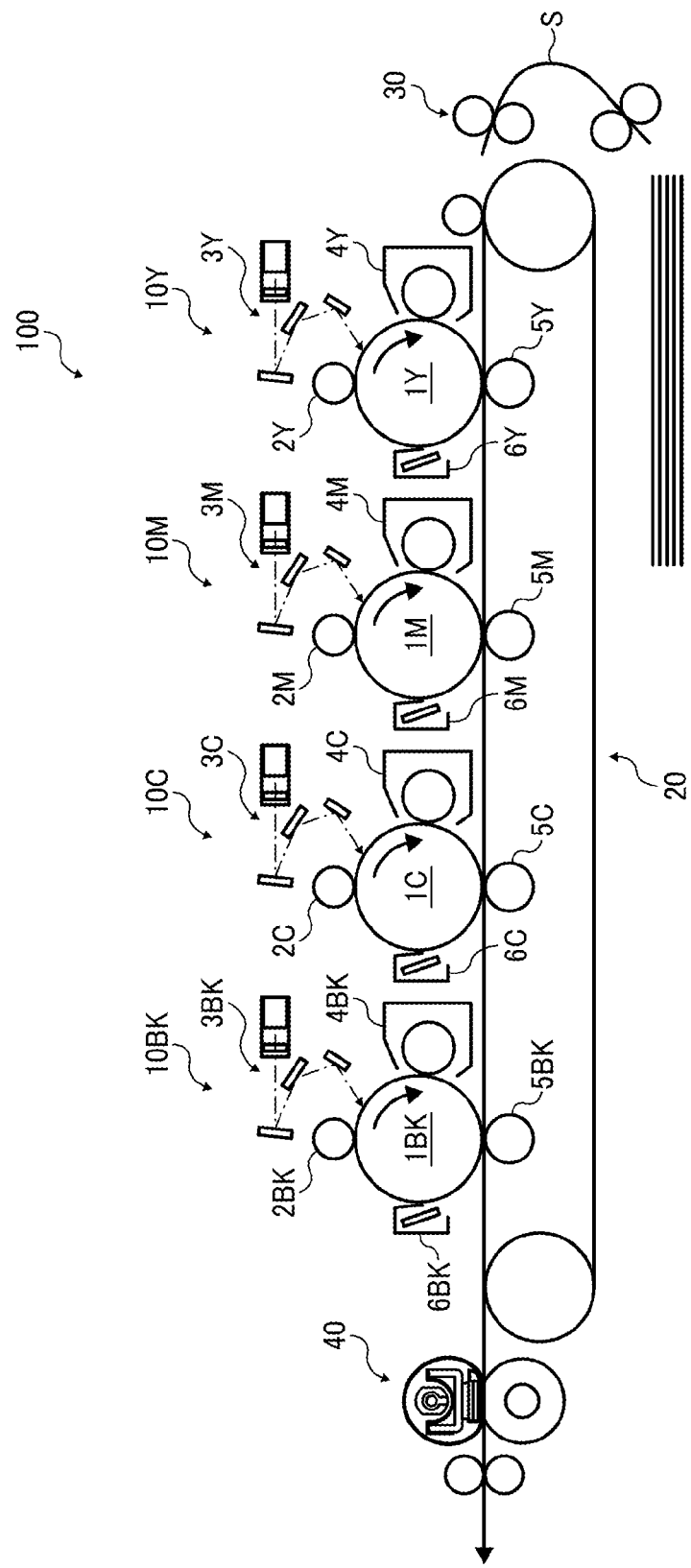
FIG. 12 is a diagram schematically illustrating an exemplary configuration of an image forming apparatus according to one embodiment of the present invention.

Now, an image forming apparatus according to one embodiment of the present invention is described with reference to FIG. 12. FIG. 12 is a diagram schematically illustrating a configuration of the image forming apparatus according to one embodiment of the present invention.

As shown there, the image forming apparatus 100 employs an electro-photographic system, and includes four pairs of image forming units 10Y, 10M, 10C, and 10Bk as examples of image forming apparatuses and a fixing device 40 as a fixing unit. The respective image forming units 10Y, 10M, 10C, and 10Bk include photoconductive drums 1Y, 1M, 1C, and 1Bk as examples of image bearers. These image forming units 10Y, 10M, 10C, and 10Bk respectively form toner images of four colors of yellow, magenta, cyan, and black on surfaces of photoconductive drums 1Y, 1M, 1C, and 1Bk, correspondingly. Below these image forming units 10Y, 10M, 10C, and 10Bk in the drawing, a sheet conveying belt 20 is stretched between and wound around a pair of rollers to convey a sheet S as one example of a sheet-shaped recording medium through each of the image forming units 10Y, 10M, 10C, and 10Bk. The sheet S is electrostatically adsorbed onto a surface of the sheet conveying belt 20. The respective photoconductive drums 1Y, 1M, 1C, and 1Bk in the image forming units 10Y, 10M, 10C, and 10Bk are rotatably disposed with outer circumferential surfaces contacting the sheet conveying belt 20. Toner images formed on the surfaces of the photoconductive drum 1Y, 1M, 1C, and 1Bk are sequential transferred onto the sheet S conveyed by the sheet conveying belt 20. Since these four sets of the image forming units 10Y, 10M, 10C, and 10Bk have substantially the identical structure with each other, the image forming unit 10Y for yellow disposed most upstream in a sheet conveying direction is typically described here in below. That is, detailed descriptions of the image forming units 10M, 10C, and 10Bk of the other colors are omitted while putting corresponding suffixes. The image forming unit 10Y includes the photoconductive drum 1Y contacting the surface of the sheet conveying belt 20 almost at central position thereof. Around the photoconductive drum 1Y, an electric charging device 2Y, an exposing device 3Y, a developing device 4Y, a transfer roller 5Y, a cleaner 6Y, and an electric charge removing lamp, not illustrated, are disposed. The electric charging device 2Y, the exposing device 3Y, the developing device 4Y, the transfer roller 5Y (i.e., a transfer device), the cleaner 6Y, and, the electric charge removing lamp are arranged in an order in a rotational direction of the photoconductive drum 1Y. The electric charging device 2Y electrically charges the surface of the photoconductive drum 1Y to provide a prescribed potential thereon. The exposing device 3Y provides an exposing process to the surface of the photoconductive drum 1Y charged in this way based on a color separated image signal to form an electrostatic latent image thereon. The developing device 4Y develops the electrostatic latent image formed on the surface of the photoconductive drum 1Y by supplying yellow toner thereto. The transfer roller 5Y (i.e., the transfer device) transfers the toner image developed as described above onto the sheet S conveyed via the sheet conveying belt 20. The cleaner 6Y removes residual toner not transferred from and remaining on the surface of the photoconductive drum 1Y. The electric charge removing lamp removes electric charge, not shown, remaining on the surface of the photoconductive drum 1Y. In a lower right section of the sheet conveying belt 20 in the drawing, a sheet feeding mechanism 30 is disposed to feed the sheet S onto the sheet conveying belt 20.

The fixing device 40 is disposed on a left side of the sheet conveying belt 20 in the drawing. The sheet S conveyed by the sheet conveying belt 20 is conveyed along the sheet conveying path continuously extended from the sheet conveying belt 20 through the fixing device 40 and accordingly passes through the fixing device 40. The fixing device 40 applies pressure and heat from a halogen heater 42 and a pressing roller 50, respectively, as described later more in detail to the sheet S conveyed bearing the toner image composed of each of colors on its surface. Thus, the fixing device 40 fixes the toner image of each of colors onto the sheet S while letting the toner image to melt and penetrate the sheet S. Subsequently, the fixing device 40 ejects the sheet S toward a downstream of the sheet conveying path through a pair of sheet ejecting rollers.

Figure 13:
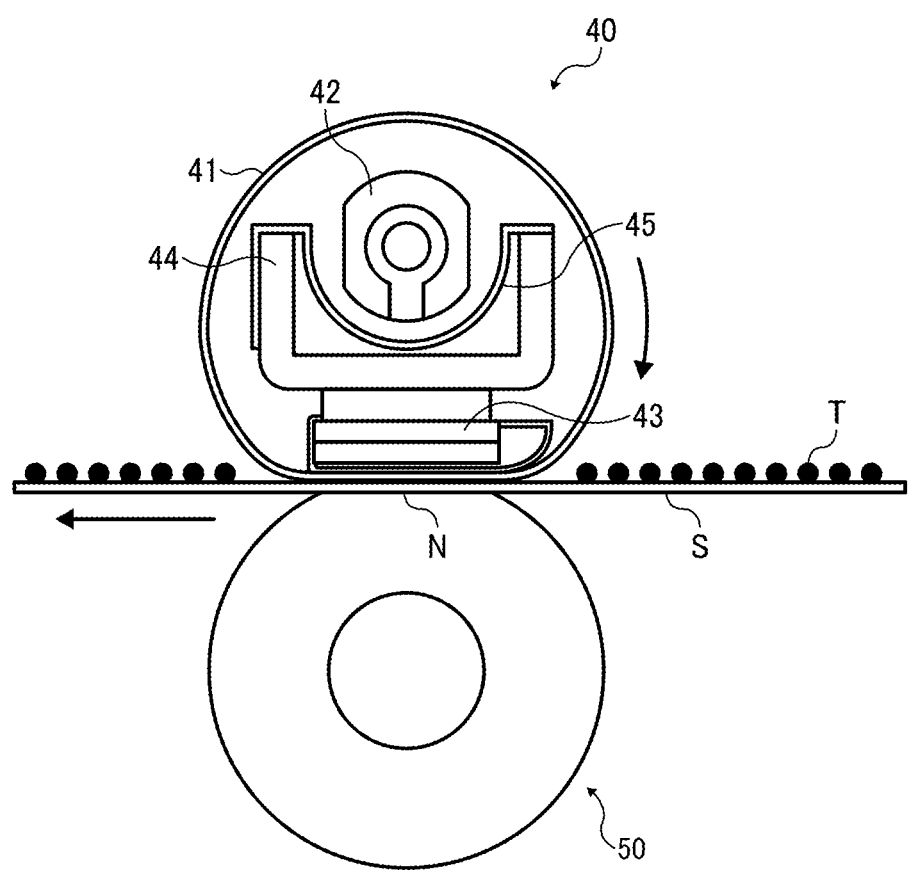
FIG. 13 a diagram schematically illustrating an exemplary configuration of a fixing device provided in the image forming apparatus as shown in FIG. 12 according to one embodiment of the present invention.

Now, a fixing device according to one embodiment of the present invention is described with reference to FIG. 13. In FIG. 13, an exemplary configuration of the fixing device provided in the image forming apparatus as shown in FIG. 12 is illustrated. As shown there, the fixing device 40 includes a fixing belt 41 as one example of a heating rotator and a pressing roller 50 opposed to the fixing belt 41 as one example of a pressing rotator. The pressing roller 50 may be prepared by using one of the above-described molding systems as described with reference to FIGS. 2 and 7 to 9. The fixing device 40 accommodates a heater 42 as one example of a heat source to heat the fixing belt 41. Instead of the halogen heater 42, a carbon heater may be employed as well. The fixing device 40 includes a nip forming member 43 inside the fixing belt 41, a stay 44 to support the nip forming member 43 as a support mem, and a reflective member 45 to reflect a light beam emitted from the halogen heater 42 toward the fixing belt 41 or the like. The pressing roller 50 is pressed against a rotating surface of the fixing belt 41 via an outer surface thereof. The sheet S bearing the toner image T thereon is conveyed to a fixing nip formed between the fixing belt 41 and the pressing roller 50.

According to one aspect of the present invention, since a branch structure causing a problem and/or a weld line is eliminated (from a molding mold) by making a molding material introduction hole (i.e., a material gate) connected to the columnar cavity into a single gate while coaxially arranging the molding material introduction hole, the metal shaft, and the cylindrical cavity with each other and only holding an upper end of the metal shaft at the same time, a highly accurate foamed tube can be molded while suppressing occurrence of a parting line on a molded article. That is, a foamed body molding system of one aspect of the present invention comprises a side mold that defines a vertically columnar inner space while constituting a side surface of the cylindrical cavity, a flange unit that includes an upper connection member connected to an upper end of the side mold to constitute an upper surface of the cylindrical cavity, a first vent hole to connect the cylindrical cavity with an upper space thereof (through the upper connection member to vent air therein), and a metal shaft having a diameter smaller than an inner diameter of the cylindrical cavity, supported within and coaxially with the cylindrical cavity by the upper connection member, an upper cap unit that holds the flange unit from above and connects the side mold with the flange unit while having a second vent hole to vent air ejected from the first vent hole to outside the foamed body molding system, and a lower cap unit that includes a lower connection member to connect to the side mold from below the side mold while constituting a lower surface of the cylindrical cavity and a raw molding material introduction cylindrical hole coaxially formed with the columnar inner space to introduce a composition consisting essentially of molding-purpose foam resin from below the cylindrical cavity.

According to another aspect of the present invention, a more highly accurate foamed tube can be molded. That is, an opening of the raw molding material introduction hole to the cylindrical cavity is located below a lower end of the metal shaft, and a distance from the opening of the raw molding material introduction cylindrical hole to the lower end of the metal shaft is $R^2/2R$ or more, where a diameter of the raw molding material introduction cylindrical hole is 2R.

According to yet another aspect of the present invention, a more highly accurate foamed tube can be molded, because a diameter of a cross section of the lower end of the metal shaft gradually decreases toward a tip of the metal shaft.

According to yet another aspect of the present invention, a more highly accurate foamed tube can be molded, because the upper connection member and the metal shaft are detachably attached to each other at a fitting section therebetween.

According to yet another aspect of the present invention, a more highly accurate foamed tube can be molded, because the upper connection member includes a magnet and the metal shaft with a ferromagnetic member is magnetically held by the magnet of the upper connection member.

According to yet another aspect of the present invention, a more highly accurate foamed tube can be molded, because the foamed tube constitutes a foamed body layer of a roller when employed in an electro-photographic fixing device.

According to yet another aspect of the present invention, a foamed body molding system can provide a highly durable roller because it employs a quality foamed tube overlying a metal shaft of the roller and adhesive strength between the foamed tube and the core of the roller rarely locally decreases. That is, a roller employed in an electro-photographic fixing device includes an elastic layer constituted by a foamed body produced by a foamed body molding system that comprises a side mold that defines a vertically columnar inner space while constituting a side surface of the cylindrical cavity, a flange unit that includes an upper connection member connected to an upper end of the side mold to constitute an upper surface of the cylindrical cavity, a first vent hole to connect the cylindrical cavity with an upper space thereof (through the upper connection member to vent air therein), and a metal shaft having a diameter smaller than an inner diameter of the cylindrical cavity, supported within and coaxially with the cylindrical cavity by the upper connection member, an upper cap unit that holds the flange unit from above and connects the side mold with the flange unit while having a second vent hole to vent air ejected from the first vent hole outside the foamed body molding system, and a lower cap unit that includes a lower connection member to connect to the side mold from below the side mold while constituting a lower surface of the cylindrical cavity and a raw molding material introduction cylindrical hole coaxially formed with the columnar inner space to introduce a composition consisting essentially of molding-purpose foam resin from below the cylindrical cavity.

According to yet another aspect of the present invention, a foamed body molding system can provide a more highly durable roller, because an opening of the raw molding material introduction hole to the cylindrical cavity is located below the lower end of the metal shaft, and a distance from the opening of the raw molding material introduction cylindrical hole to the lower end of the metal shaft is $R^2/2R$ or more, where a diameter of the raw molding material introduction cylindrical hole is 2R.

According to yet another aspect of the present invention, a foamed body molding system can provide a more highly durable roller, because a diameter of the lower end of the metal shaft gradually decreases toward a tip of the metal shaft.

According to yet another aspect of the present invention, a foamed body molding system can provide a more highly durable roller, because the upper connection member and the metal shaft are detachably attached to each other at a fitting section therebetween.

According to yet another aspect of the present invention, a foamed body molding system can provide a more highly durable roller, because the upper connection member includes a magnet and the metal shaft with a ferromagnetic member is magnetically held by the magnet of the upper connection member.

Numerous additional modifications and variations of the present invention are possible in light of the above teachings. It is therefore to be understood that within the scope of the appended claims, the present invention may be executed otherwise than as specifically described herein. For example, the foamed body molding system, the roller with the foamed body molded by the foamed body molding system, and the image forming apparatus with the roller are not limited to the above-described various embodiments and may be altered as appropriate.

What is claimed is:

1. A foamed body molding system for molding a foamed tube with a cylindrical cavity, the foamed body molding system comprising:
    a side mold defining a vertically columnar inner space, the side mold constituting a side surface of the cylindrical cavity;
    a flange unit including:
        an upper connection member connected to an upper end of the side mold to constitute an upper surface of the cylindrical cavity;
        a first vent hole to connect the cylindrical cavity with an upper space formed above the upper connection member through the upper connection member to vent air therein; and
        a metal shaft having a diameter smaller than an inner diameter of the cylindrical cavity, the metal shaft supported within and coaxially with the cylindrical cavity by the upper connection member;
    an upper cap unit to hold the flange unit from above the flange unit and connect the side mold with the flange unit, the upper cap unit having a second vent hole to vent air ejected from the first vent hole outside the foamed body molding system; and
    a lower cap unit including:
        a lower connection member to connect to the side mold from below the side mold and constitute a lower surface of the cylindrical cavity; and
        a raw molding material introduction cylindrical hole to introduce a composition consisting essentially of molding purpose foam resin from below, the raw molding material introduction cylindrical hole coaxially formed with the columnar inner space.

2. The foamed body molding system as claimed in claim 1, wherein an opening of the raw molding material introduction hole to the cylindrical cavity is located below a lower end of the metal shaft,
    wherein a distance from the opening of the raw molding material introduction cylindrical hole to the lower end of the metal shaft is $R^2/2R$ or more, where a diameter of the raw molding material introduction cylindrical hole is 2R.

3. The foamed body molding system as claimed in claim 1, wherein a diameter of the lower end of the metal shaft gradually decreases toward a tip of the metal shaft.

4. The foamed body molding system as claimed in claim 1, wherein the upper connection member and the metal shaft are detachably attached to each other at a fitting section therebetween.

5. The foamed body molding system as claimed in claim 1, wherein the upper connection member includes a magnet and the metal shaft includes a ferromagnetic member,
    wherein the metal shaft is magnetically held by the magnet of the upper connection member.

6. The foamed body molding system as claimed in claim 1, wherein the foamed tube constitutes a foamed body layer of a roller employed in an electro-photographic fixing device.

7. A roller employed in an electro-photographic fixing device, the roller having an elastic layer constituted by a foamed body, the foamed body produced by a foamed body molding system, the foamed body molding system comprising:
- a side mold defining a vertically columnar inner space, the side mold constituting a side surface of the cylindrical cavity;
- a flange unit including:
  - an upper connection member connected to an upper end of the side mold to constitute an upper surface of the cylindrical cavity;
  - a first vent hole to connect the cylindrical cavity with an upper space formed above the upper connection member through the upper connection member to vent air therein; and
  - a metal shaft having a diameter smaller than an inner diameter of the cylindrical cavity, the metal shaft supported within and coaxially with the cylindrical cavity by the upper connection member;
- an upper cap unit to hold the flange unit from above the flange unit and connect the side mold with the flange unit, the upper cap unit having a second vent hole to vent air ejected from the first vent hole outside the foamed body molding system; and
- a lower cap unit including:
  - a lower connection member to connect to the side mold from below the side mold and constitute a lower surface of the cylindrical cavity; and
  - a raw molding material introduction cylindrical hole to introduce a composition consisting essentially of molding purpose foam resin from below, the raw molding material introduction cylindrical hole coaxially formed with the columnar inner space.

8. The roller as claimed in claim 7, wherein the roller constitutes a fixing roller to fix a toner image onto a recording sheet.

9. The roller as claimed in claim 7, wherein the roller constitutes a pressing roller to press against a fixing roller, the pressing roller including a pair of grips at both side ends thereof, respectively, to transmit torque to the fixing roller.

10. The roller as claimed in claim 7, wherein an opening of the raw molding material introduction hole to the cylindrical cavity is located right below a lower end of the metal shaft,
wherein a distance from the opening of the raw molding material introduction cylindrical hole to the lower end of the metal shaft is $R^2/2R$ or more, where a diameter of the raw molding material introduction cylindrical hole is 2R.

11. The roller as claimed in claim 7, wherein a diameter of the lower end of the metal shaft gradually decreases toward a tip of the metal shaft.

12. The roller as claimed in claim 7, wherein the upper connection member and the metal shaft are detachably attached to each other at a fitting section therebetween.

13. The roller as claimed in claim 7, wherein the upper connection member includes a magnet and the metal shaft includes a ferromagnetic member,
wherein the metal shaft is magnetically held by the magnet of the upper connection member.

14. The roller as claimed in claim 7, wherein the foamed tube constitutes a foamed body layer of a roller employed in an electro-photographic fixing device.

15. An image forming apparatus comprising:
- a housing; and
- a roller having an elastic layer constituted by a foamed body, the foamed body produced by a foamed body molding system, the foamed body molding system comprising:
  - a side mold defining a vertically columnar inner space, the side mold constituting a side surface of the cylindrical cavity;
  - a flange unit including:
    - an upper connection member connected to an upper end of the side mold to constitute an upper surface of the cylindrical cavity;
    - a first vent hole to connect the cylindrical cavity with an upper space formed above the upper connection member through the upper connection member to vent air therein; and
    - a metal shaft having a diameter smaller than an inner diameter of the cylindrical cavity, the metal shaft supported within and coaxially with the cylindrical cavity by the upper connection member;
  - an upper cap unit to hold the flange unit from above and connect the side mold with the flange unit, the upper cap unit having a second vent hole to vent air ejected from the first vent hole outside the foamed body molding system; and
  - a lower cap unit including:
    - a lower connection member to connect to the side mold from below the side mold and constitute a lower surface of the cylindrical cavity; and
    - a raw molding material introduction cylindrical hole to introduce a composition consisting essentially of molding purpose foam resin from below, the raw molding material introduction cylindrical hole coaxially formed with the columnar inner space.

16. The image forming apparatus as claimed in claim 15, wherein an opening of the raw molding material introduction hole to the cylindrical cavity is located right below the lower end of the metal shaft,
wherein a distance from the opening of, the raw molding material introduction cylindrical hole to the lower end of the metal shaft is $R^2/2R$ or more, where a diameter of the raw molding material introduction cylindrical hole is 2R.

17. The image forming apparatus as claimed in claim 15, wherein a diameter of the lower end of the metal shaft gradually decreases toward a tip of the metal shaft.

18. The image forming apparatus as claimed in claim 15, wherein the upper connection member and the metal shaft are detachably attached to each other at a fitting section therebetween.

19. The image forming apparatus as claimed in claim 15, wherein the upper connection member includes a magnet and the metal shaft includes a ferromagnetic member,
wherein the metal shaft is magnetically held by the magnet of the upper connection member.

20. The image forming apparatus as claimed in claim 15, wherein the foamed tube is used as a foamed body layer of a fixing roller employed in an electro-photographic fixing device.

* * * * *